United States Patent [19]

Shinohara et al.

[11] Patent Number: 4,987,824
[45] Date of Patent: Jan. 29, 1991

[54] TANDEM-TYPE VACUUM BOOSTER WITH NOISE SUPPRESSING AIR PASSAGE

[75] Inventors: Takayoshi Shinohara; Kiyotaka Kobayashi; Yoshiharu Nagafuji, all of Ueda, Japan

[73] Assignee: Nissin Kogyo Kabushiki Kaisha, Ueda, Japan

[21] Appl. No.: 311,245

[22] Filed: Feb. 16, 1989

[30] Foreign Application Priority Data

Feb. 17, 1988 [JP] Japan .............................. 63-19438[U]

[51] Int. Cl.$^5$ .................................................. F15B 9/10
[52] U.S. Cl. ........................................ 91/369.1; 92/48
[58] Field of Search ............... 91/376 R, 369.1, 369.2, 91/534; 60/547.1; 92/48

[56] References Cited

U.S. PATENT DOCUMENTS

| | | | |
|---|---|---|---|
| 3,517,588 | 6/1970 | Kytta | 91/369 |
| 4,716,814 | 1/1988 | Yamakoshi | 91/376 R |
| 4,718,326 | 1/1988 | Sugiura et al. | 91/376 RX |
| 4,885,979 | 12/1989 | Macht et al. | 91/376 RX |

FOREIGN PATENT DOCUMENTS

0173338  2/1988  European Pat. Off. .

Primary Examiner—Edward K. Look
Assistant Examiner—John E. Ryznic
Attorney, Agent, or Firm—Armstrong, Nikaido, Marmelstein, Kubovcik & Murray

[57] ABSTRACT

A tandem-type vacuum booster comprises a partition plate fixedly mounted in a booster shell for partitioning the interior of the booster shell into a front shell chamber and a rear shell chamber; a front booster piston dividing said front shell chamber into a front-side fore vacuum chamber connected to a vacuum pressure source and a rear-side fore operating chamber; a rear booster piston dividing the rear shell chamber into a front-side hind vaccum chamber and a rear-side hind operating chamber, the both booster pistons being interconnected through a piston boss slidably carried on the partition plate and connected to an output rod; a valve tube integrally connected to the piston boss to project from a rear end of the piston boss and slidably supported on a rear wall of the booster shell; a first port permitting the interior of the valve tube to communicate with both the vaccum chambers; a second port permitting the interior of the valve tube to communicate with both the operating chambers, the first port being comprised of an axial port permitting the communication between the fore vacuum chamber and the valve tube and a radial port permitting the communication between the axial port and the hind vaccum chamber; an input rod movable back and forth within the valve tube; and a control valve for changing over the communications of the second port with the first port and the atmosphere depending upon the backward and forward movements of the input rod, the input rod and the control valve being disposed within the valve tube. In such tandem-type vacuum booster, a portion, closer to the fore vacuum chamber, of the opened edge of the radial port which is closer to the axial port is offset radially outwardly more than a portion closer to the valve tube to provide a step between both the portions. This makes it possible to provide a silent vaccum bosster in which the air-cutting-through noise is prevented.

3 Claims, 7 Drawing Sheets

TANDEM-TYPE VACUUM BOOSTER WITH NOISE SUPPRESSING AIR PASSAGE

BACKGROUND OF THE INVENTION

1. Field of the Invention

The present invention relates to a tandem-type vacuum booster used for operation of a brake master cylinder or the like of an automobile, and particularly, to an improvement of a tandem-type vacuum booster comprising a partition plate fixedly mounted in a booster shell for partitioning the interior of the booster shell into a front shell chamber and a rear shell chamber; a front booster piston dividing the front shell chamber into a frontside fore vacuum chamber connected to a vacuum pressure source and a rear-side fore operating chamber; a rear booster piston dividing the rear shell chamber into a front-side hind vacuum chamber and a rear-side hind operating chamber, the both booster pistons being interconnected through a piston boss slidably carried on the partition plate and connected to an output rod; a valve tube integrally connected to the piston boss to project from a rear end of the piston boss and slidably supported on a rear wall of the booster shell; a first passage permitting the interior of the valve tube to communicate with both the vacuum chambers; a second passage permitting the interior of the valve tube to communicate with both the operating chambers, the first passage being comprised of an axial passage permitting the communication between the fore vacuum chamber and the valve tube and a radial passage permitting the communication between the axial passage and the hind vacuum chamber; an input rod movable back and forth within the valve tube; and a control valve for changing over the communications of the second passage with the first passage and the atmosphere depending upon the backward and forward movements of the input rod, the input rod and the control valve being disposed within the valve tube.

2. Description of the Prior Art

Figure 7:
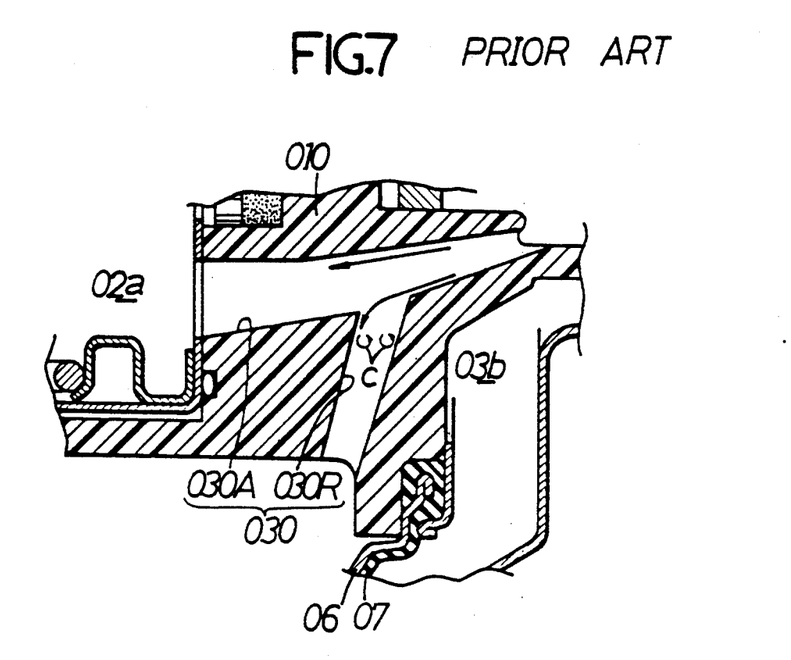
FIG. 7 is a sectional view of the detail of the prior art tandem-type vacuum booster.

Such vacuum booster has conventionally been known, for example, as disclosed in Japanese Utility Model Application Laid-open No. 121160/87. In such known vacuum booster, however, when the fore and hind vacuum chambers are put in communication with the fore and hind operating chambers through the first and second passages by the retreating operation of the input rod in order to bring the vacuum booster from an operative state back to an inoperative state, the air hitherto occupaying the operating chambers is rapidly drawn from the second passage via the axial passage of the first passage into the fore vacuum chamber. During this time, the air flows at a high rate through the axial passage from the side of the valve tube toward the fore vacuum chamber. However, it has been investigated by the present inventors that in the prior art booster, a part of the air flowing through the axial port 030A diverts toward the axial port 030R, as shown in FIG. 7, to creat a vortex c in the vicinity of the opening of the passage 030R, which is attributable to an operational noise (an air-cutting-through noise).

SUMMARY OF THE INVENTION

The present invention has been accomplished with such circumstances in view, and it is an object of the present invention to provide a tandem type vacuum booster in which when the air flows at a high rate through the axial passage of the first passage, any vertex is prevented from being produced in the vicinity of the opening of the radial passage to suppress the operational noise to a low level.

To attain the above object, according to the present invention, there is proposed a tandem-type vacuum booster wherein a portion, closer to the fore vacuum chamber, of that opened edge of the radial passage which is closer to the axial passage is offset radially outwardly more than a portion closer to the valve tube to provide a step between both the portions.

With the above construction, the portion, closer to the fore vacuum chamber, of that opened edge of the radial passage which is closer to the axial passage is offset radially outwardly more than the portion closer to the valve tube to provide the step between both the portions and hence, when the air flows at a high rate through the axial passage of the first passage, diverting of the air into the radial passage can be prevented to suppress the production of any vertex and therefore, it is possible to provide a silent vacuum booster in which the air-cutting-through noise is prevented.

In addition, if the valve tube-side portion of the opened edge of the radial passage closer to the axial port is protruded in the form of a shelf toward the portion closer to the fore vacuum chamber, a leaping effect of the air flowing through the axial passage over the radial passage can be improved to provide a more reliable prevention of the diverting of the air into the radial passage.

The above and other objects, features and advantages of the invention will become apparent from a reading of the following description of the preferred embodiments, taken in conjunction with the accompanying drawings.

BRIEF DESCRIPTION OF THE DRAWINGS

FIGS. 1 to 5 illustrate a first embodiment of the present invention, wherein

DESCRIPTION OF THE PREFERRED EMBODIMENTS

A first embodiment of the present invention will now be described with reference to FIGS. 1 to 5.

Figure 1:
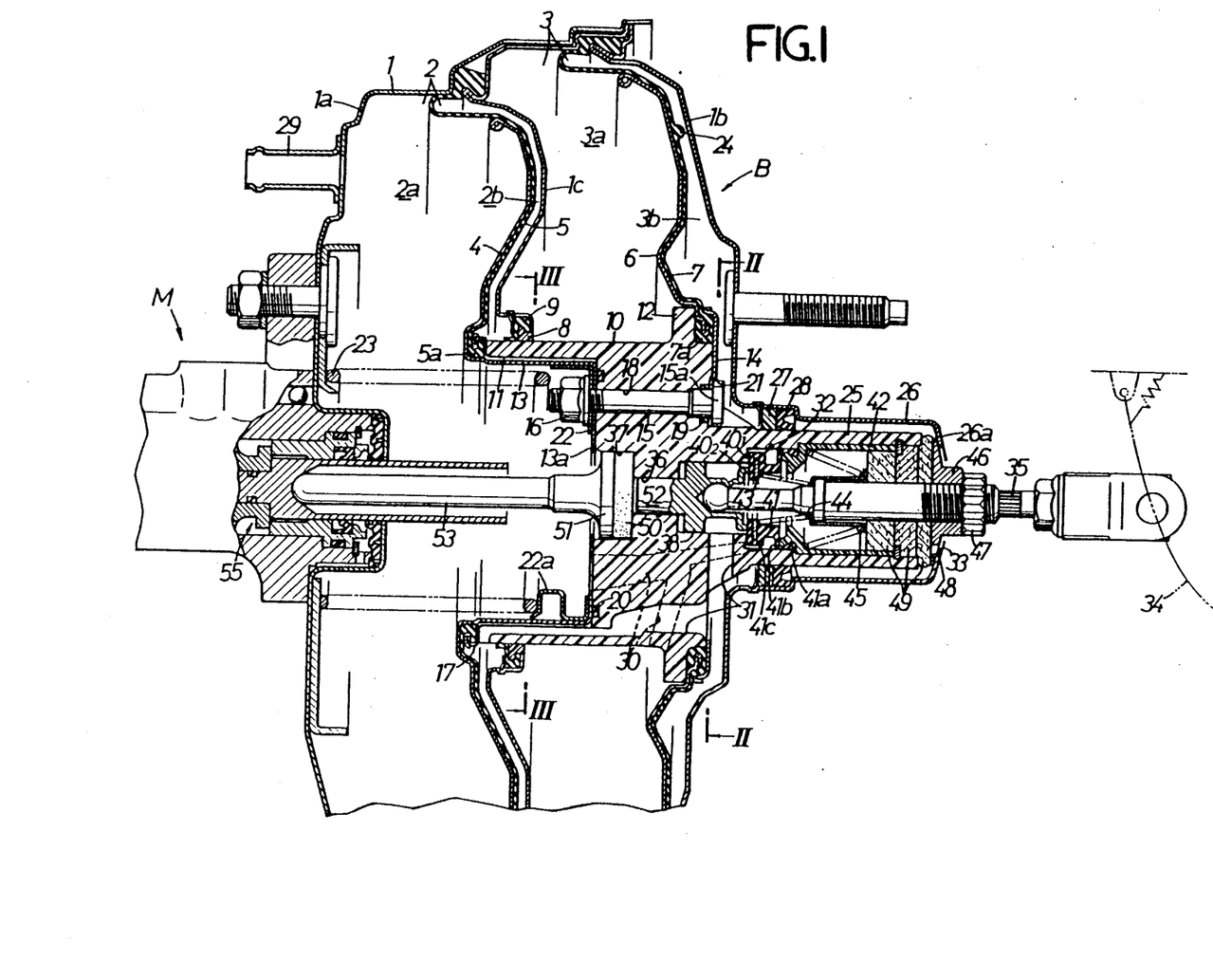
FIG. 1 is a side view in longitudinal section of a tandem-type vacuum booster in an inactive state.
Figure 2:
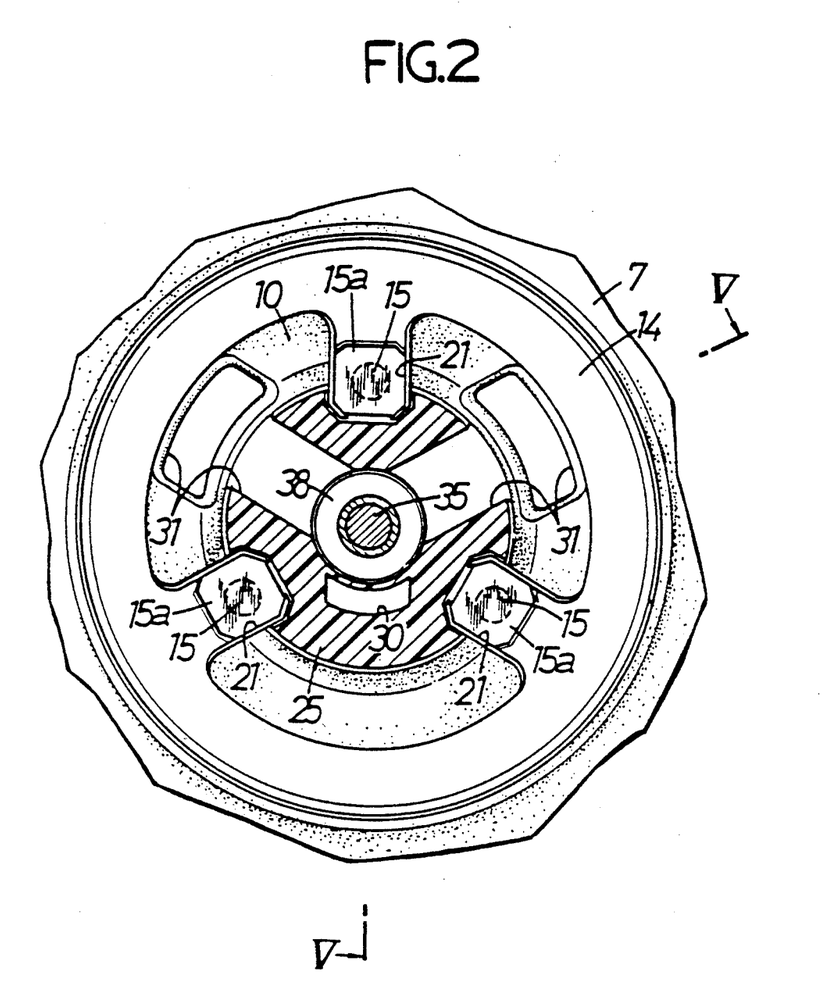
FIG. 2 is a sectional view taken along a line II—II in FIG. 1.
Figure 3:
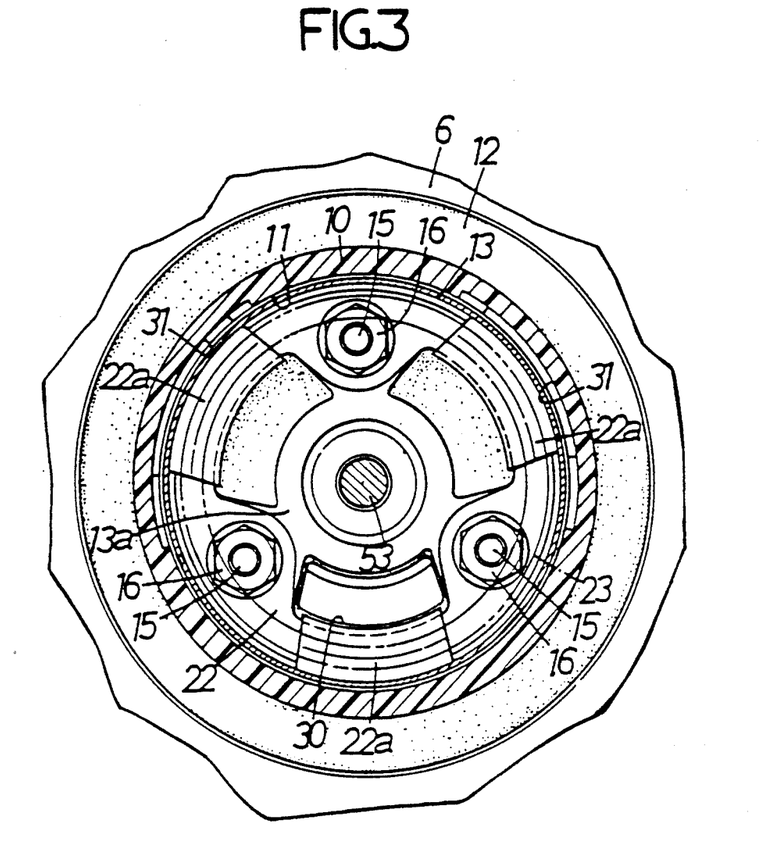
FIG. 3 is a sectional view taken along a line III—III in FIG. 1.
Figure 4:
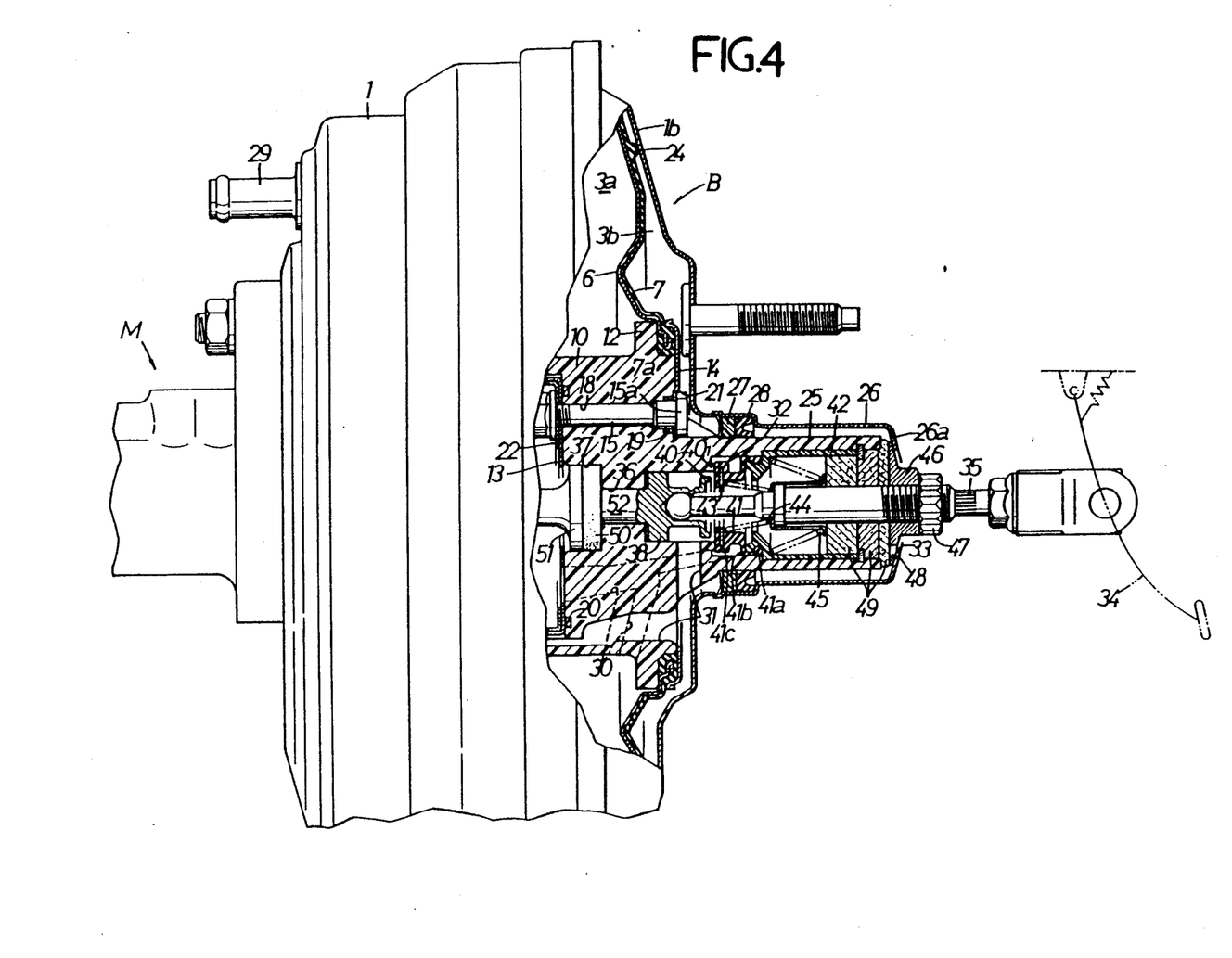
FIG. 4 is a partially longitudinal sectional side view of the vacuum booster in a state after completion of the operation and just before returning to the inactive state.

Referring to FIG. 1, a brake master cylinder M is mounted on a front face of a booster shell 1 of a tandem-type vacuum booster B and is operated by the booster B.

The booster shell 1 is comprised of a pair of front and rear shell halves 1a and 1b coupled at their opposed ends with each other, and a partition plate 1c clamped between both the shell halves 1a and 1b to partition the interior of the booster shell 1 into a front shell chamber 2 and a rear shell chamber 3, the rear shell half 1b being supported on a vehicle body which is not shown.

The front shell chamber 2 is divided into a front-side fore vacuum chamber 2a and a rear-side fore operating chamber 2b by a front booster piston 4 which is longitudinally reciprocally received in the front shell chamber 2, and by a front diaphragm 5 which is overlaid on and bound to a back of the front booster piston 4 and clamped between the front shell half 1a and the partition plate 1c. The rear shell chamber 3 is divided into a front-side hind vacuum chamber 3a and a rear-side hind operating chamber 3b by a rear booster piston 6 which is longitudinally reciprocally received in the rear shell chamber 3, and by a rear diaphragm 7 which is overlaid on and bound to a back of the rear booster piston 6 and secured between both the shell halves 1a and 1b.

The front and rear booster pistons 4 and 6 are each shaped into an annular form from a steel plate and are bound, in the following manner, to a piston boss 10 made of a synthetic resin in the form of a boss portion slidably carried on the partition plate 1c through a bush 8 and a sealing member 9.

More specifically, the piston boss 10 is provided at its front end face with a circular recess 11 of a depth corresponding to a substantially one half of the axial length of the boss 10 and includes a flange 12 provided in projection on an outer peripheral surface thereof at a point forwardly slightly spaced apart from the rear end thereof. A connecting tube 13, which is connected to an inner peripheral end of the front booster piston 4 and having an end wall plate 13a, is fitted in the circular recess 11, and a holding plate 14 is overlaid on a rear end face of the piston boss 10 to cooperate with the flange 12 to clamp the rear booster piston 6 therebetween. The holding plate 14, the piston boss 10 and the end wall plate 13a are secured together by a plurality of (three in the illustrated embodiment) bolts 15 surrounding an axis of the piston boss 10 and by nuts 16 screwed over these bolts.

In this case, an inner peripheral bead 5a of the front diaphragm 5 and an annular retainer 17 covering an outer peripheral surface and rear face of the inner peripheral bead 5a are clamped between the front booster piston 4 and the front end face of the piston boss 10, and an inner peripheral bead 7a of the rear diaphragm 7 covering an inner peripheral end of the rear booster piston 6 is clamped between the flange 12 and the holding plate 14. Thus, the front and rear booster pistons 4 and 6 and the piston boss 10 are bound mutually, while at the same time, the respective inner peripheral beads 5a and 7a of the diaphragms 5 and 7 are secured to the corresponding booster pistons 4 and 6.

Further, a sealing member 19 is mounted in a bolt hole 18 provided in the piston boss 10 for permitting insertion of the through bolt 15 thereinto, thereby blocking the communication between the fore vacuum chamber 2a and the hind operating chamber 3b through the bolt hole 18. A sealing member 20 is also interposed between the end wall plate 13a and the piston boss 10 so as to surround the plurality of through bolts 15, thereby blocking the communication between first and second passages 30 and 31 which will be described hereinafter, through a clearance between abutment surfaces of the end wall plate 13a and the piston boss 10.

Each of the through bolts 15 is disposed with its polygonal head 15a faced to the hind operating chamber 3b, and the holding plate 14 is provided with a recess 21 of the same shape as the polygonal head 15a (see FIG. 2), into which the polygonal head 15a is fitted unrotatably. Thus, when the nut 16 is screwed over the through bolt 15 on the side of the fore vacuum chamber 2a, the rotation of that bolt 15 is prevented, ensuring that the tightening of the nut 16 can be reliably performed.

A seat plate 22 is overlaid on and bound to the end wall plate 13a of the connecting tube 13 by utilizing the above-described bolt 15 and nut 16. The seat plate 22 includes a plurality of seats 22a each raised higher than the height of the nut 16 between the adjacent two of the nuts 16 (see FIG. 3), and a return spring 23 is provided in compression between the seats 22a and the front shell half 1a. The piston boss 10 and thus the booster pistons 4 and 6 are always biased in a retreating direction by a spring force of the return spring 23. Retreat limits for the booster piston 4 and 6 are provided by abutment of a number of projections 24 raised on a back surface of the rear diaphragm 7 against the rear wall of the booster shell 1.

A valve tube 25 is integrally provided on the rear end of the piston boss 10 to project therefrom and is slidably carried through a bush 27 and a sealing member 28 on a rearwardly extended tube 26 which is protruded from the rear wall of the booster shell 1 to cover the valve tube 25.

The fore vacuum chamber 2a is connected through a vacuum inlet pipe 29 to a vacuum pressure source V (for example, an interior of an intake manifold of an internal combustion engine) which is not shown. The fore and hind vacuum chambers 2a and 3a also communicate with the interior of the valve tube 25 through a first bifurcated passage 30 made in the piston boss 10, while the fore and hind operating chambers 2b and 3b likewise communicate with the interior of the valve tube 25 through a pair of second bifurcated passages 31 made in the piston boss 10. The second passages 31 are alternately changed over in communication with the first passage 30 and with an air feed passage 33 opened in an end wall 26a of the rearwardly extended tube 26 by a control valve 32.

Figure 5:
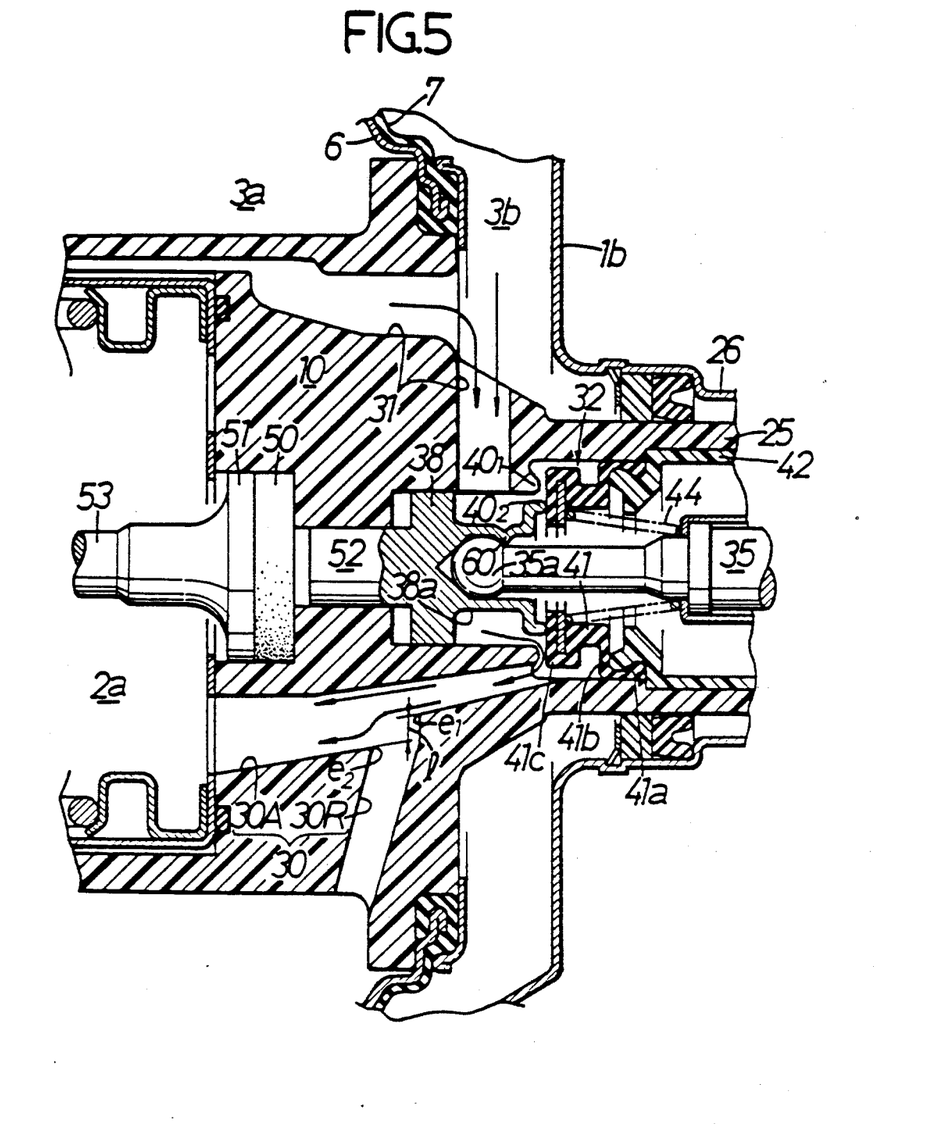
FIG. 5 is an enlarged view (a sectional view taken along a line V—V in FIG. 2) of the detail of the vacuum booster for explaining the operation.

As clearly shown in FIG. 5, the first passage 30 is comprised of an axial passage 30A substantially parallel to an axis of the piston boss 10 and permitting the communication between the fore vacuum chamber 2a and the valve tube 25, and a radial passage 30R diverged from the middle of the axial passage 30A into the hind vacuum chamber 3a. A portion $e_2$, closer to the fore vacuum chamber 2a, of that opened edge of the radial passage 30R which is closer to the axial passage 30A is offset radially outwardly more than a portion $e_1$ closer to the valve tube 25, thereby providing a radial step 1 between both the portions $e_1$ and $e_2$.

An input rod 35 connected to a brake pedal 34 and the control valve 32 controlled by the input rod are mounted in the valve tube 25 in the following manner. A valve piston 38 is slidably received in a front portion within the valve tube 25, and a spherical front end 35a of the input rod 35 passed through the air feed passage 33 is fitted in a central portion of the valve piston 38. An outer periphery of an intermediate portion of the valve piston 38 is provided with an annular groove 38a faced by opened ends of the second ports 31, so that the spherical front end 35a of the input rod 35 is oscilatably coupled to the valve piston 38 by caulking the bottom of the annular groove 38a at some of its points 60 (one of which is shown).

A first annular valve seat $40_1$ is provided in a projecting manner on an inner peripheral surface of the valve tube 25, and a second valve seat $40_2$ is formed on a rear end face of the valve piston 38 and surrounded by the first valve seat. A valve member 41 cooperating with the valve seats $40_1$ and $40_2$ is disposed in the valve tube 25. The valve member 41 is made of a rubber and is cylindrically shaped with its longitudinal opposite ends opened. A rear or base end 41a of the valve member 41 is held in close contact with the inner peripheral surface of the valve tube 25 by a holding tube 42 fitted on the inner peripheral surface of the valve tube 25. The valve member 41 includes a thin flexible portion 41b bended radially inwardly from the base end 41a, and a thick valve portion 41c connected to a front end portion of the flexible portion 41b, the valve portion 41c being disposed in an opposed relation to the first and second valve seats $40_1$ and $40_2$.

The valve portion 41c is capable of moving back and forth by deformation of the flexible portion 41b, so that it seats on the first and second valve seats $40_1$ and $40_2$ upon forward movement, and it is received on the front end of the holding tube 42 upon backward movement.

An annular reinforcing plate 43 is embedded in the valve portion 41c, and a valve spring 44 is provided in compression between the reinforcing plate 43 and the input rod 35 for biasing the valve portion 41c toward the valve seats $40_1$ and $40_2$.

One end of the first passage 30 is opened in the inner surface of the valve tube 25 outside the first valve seat $40_1$, while one end of each of the second passages 31 are likewise opened in the inner surface of the tube 25 inside the first valve seat $40_1$.

The inside of the second valve seat $40_2$ communicates with the air feed passage 33 through hollow portions of the valve member 41 and the holding tube 42.

The control valve 32 is constructed by the valve member 41, the valve spring 44, the first valve seat $40_1$ and the second valve seat $40_2$.

Referring again to FIG. 1, a return spring 45 is provided in compression between the input rod 35 and the holding tube 42 for biasing the input rod 35 toward its retreat limit.

The retreat limit of the input rod 35 is provided by abutment of a stopper plate 46 screwed over the input rod 35 for adjustment in advancing and retreating movement against an inner surface of the end wall 26a of the rearwardly extended tube 26. Thus, turning of the stopper plate 46 causes a variation in position of the stopper plate 46 screwed over the input rod 35, thereby ensuring that the retreat limit of the input rod 35 can be longitudinally adjusted. The locking of the stopper plate 46 after such adjustment is carried out by tightening of the lock nut 47 screwed over the input rod 35. A vent hole 48 is provided in the stopper plate 46 to prevent the air feed passage 33 from being blocked by the stopper plate 46.

An air filter 49 is mounted in the valve tube 25 to surround the input rod 35, for filtering air introduced through the air feed passage 33 into the valve tube 25. The air filter 49 has a moderate pliability such that it will not hinder the relative displacement of the input rod 35 and the valve tube 25.

The piston boss 10 is provided with a larger cylinder bore 37 opened in a central portion of a front face thereof, and a smaller cylinder bore 36 opened at its opposite ends into the larger cylinder bore 37 and the valve tube 25. A reaction piston 52 either integral with or abutting against the valve piston 38 is slidably received in the smaller cylinder bore 36, while a resilient piston 50 opposed to the reaction piston 52 and an output piston 51 overlaid on a fore face of the resilient piston 50 are slidably received in the larger cylinder bore 37. In order to prevent withdrawal of the output piston 51 out of the larger cylinder bore 37, an inner peripheral edge of the end wall plate 13a is protruded to an opening of the larger cylinder bore 37.

An output rod 53 is provided on a fore face of the output piston 51 to project therefrom and is connected to a piston 55 in the brake master cylinder M.

The operation of the first embodiment will be described below. First, when the vacuum booster B is inactive, the input rod 35 is located at the retreat limit as shown in FIG. 1, and the control valve 32 is in a neutral state with the valve portion 41c seated on the first and second valve seats $40_1$ and $40_2$ to put the fore and hind operating chambers 2b and 3b out of communication with any of the vacuum chambers 2a and 3a and the air feed passage 33. The control valve 32 in such a state causes a vacuum pressure in the negative pressure source supplied through the vacuum pressure introducing pipe 29 to be stored in the vacuum chambers 2a and 3a, while causing a vacuum pressure suitably diluted with the air to be maintained in the operating chambers 2b and 3b. Thus, differences in air pressures between the fore vacuum chamber 2a and operating chamber 2b and between the hind vacuum chamber 3a and operating chamber 3b apply slight advancing forces to the front and rear booster pistons 4 and 6, but these advancing forces are balanced with a repulsive force of the return spring 23, so that the booster pistons 4 and 6 are stopped at points where they have advanced slightly away from their retreat limits.

If the brake pedal 34 is now depressed to advance the input rod 35 and the valve piston 38 in order to brake a vehicle, the second valve seat $40_2$ is immediately moved away from the valve portion 41c to put the operating chambers 2b and 3b into communication with the air feed passage 33, because the booster pistons 4 and 6 are stationary. As a result, the air flowing into the valve member 41 through the air feed passage 33 passes through the second valve seat $40_2$ and then via the annular groove 38a into the second ports 31 and thus, is quickly introduced into the operating chambers 2b and 3b, so that the pressure in the chambers 2b and 3b are increased to a higher level than those in the vacuum chambers 2a and 3a. This provides a larger advancing force based on differences in air pressures between these chambers, so that the booster pistons 4 and 6 advance in good response thereto against the force of the return spring 23 to forwardly drive the piston 55 in the brake master cylinder M through the output rod 53. In this way, the brake master cylinder M can be operated without any delay from the depression of the brake pedal 34, thereby braking the vehicle.

During such braking, the valve piston 38 also advances along with the input rod 35 to abut against the resilient piston 50 through the reaction piston 52. However, the resilient piston 50 receives a reaction force from the operation of the booster pistons 4 and 6 to expand toward the smaller cylinder bore 36 and cause a portion of the reaction force to act on the reaction piston 52. Therefore, that force is fed back to the brake pedal 34 through the valve piston 38 and the input rod 35. Such an action of the reaction force enables the driver to sense the magnitude of an output from the output rod 53, i.e., a braking force.

If the output from the output rod 53 exceeds a boosting limit point due to an increase in depressing force on the brake pedal 34, i.e., in input into the input rod 35, the valve piston 38 abuts at its front face against the piston boss 10 and hence, all of the input is transmitted to the output rod 53 through the valve piston 38, the piston boss 10, the resilient piston 50 and the output piston 51. Ultimately, the sum of the advancing force provided by the difference in air pressure between the booster pistons 4 and 6 and the advancing force provided by the input is delivered from the output rod 53.

If the depression force on the brake pedal 34 is then released, the input rod 35 is first retreated along with the valve piston 38 by the repulsive force of the return spring 45, thereby causing the second valve seat $40_2$ to seat on the valve portion 41c of the valve member 41, while causing the valve portion 41c to be moved far away from the first valve portion $40_1$, so that the operating chambers 2b and 3b communicate with the vacuum chambers 2a and 3a through the first and second passage 30 and 31.

Thereupon, a strong suction of the vacuum pressure source V connected to the fore vacuum chamber 2a causes the air hitherto occupaying the operating chambers 2b and 3b to be rapidly drawn from the second passage 31 via the axial passage 30A of the first passage 30 into the fore vacuum chamber 2a, so that the difference in air pressure across the individual booster pistons 4 and 6 is eliminated. Consequently, the booster pistons 4 and 6 are retreated by the repulsive force of the return spring 23 to release the operation of the brake master cylinder M.

Now, when the air exited from the second passage 31 flows at a high rate through the axial passage 30A of the first passage 30 from the side of the valve tube 25 toward the fore vacuum chamber 2a, a part of the air intends to divert into the radial passage 30R and even if so, the air which has intended to divert into the radial passage 30R easily leaps over the radial passage 30R by its own inertia force as shown by an arrow in FIG. 5 and smoothly flows downstream the axial passage 30A, because the fore vacuum chamber-side portion $e_2$ of the opened edge of the radial passage 30R is offset radially outwardly more than the portion $e_1$ closer to the valve tube 25 to provide the step 1 between both the portions $e_1$ and $e_2$. Consequently, the generation of any vortex is suppressed in the vicinity of the opening of the radial passage 30R, without generation of any air-cutting-through noise.

When the input rod 35 has returned to the retreat limit permitting the stopper plate 46 to abut against the patition wall 26a of the extended tube 26, the rear booster piston 6 once returns to the retreat limit permitting the projection 24 of the rear diaphragm 7 to abut against the rear wall of the booster shell 1, and then causing the first valve seat $40_1$ to seat on the valve seat 41c, while causing the valve seat 41c to be slightly spaced apart from the second valve seat $40_2$. Therefore, the air is introduced again into the operating chambers 2b and 3b, and if the booster pistons 4 and 6 advance slightly due to a difference in air pressure produced thereby, the small clearance between the second valve seat $40_2$ and the valve portion 41c is eliminated, and the valve valve 32 is brought back to the original neutral state. Thus, the vacuum pressure diluted with the air is maintained in the operating chambers 2b and 3b, and the vacuum booster B is brought to the inactive state shown in FIG. 1.

Figure 6:
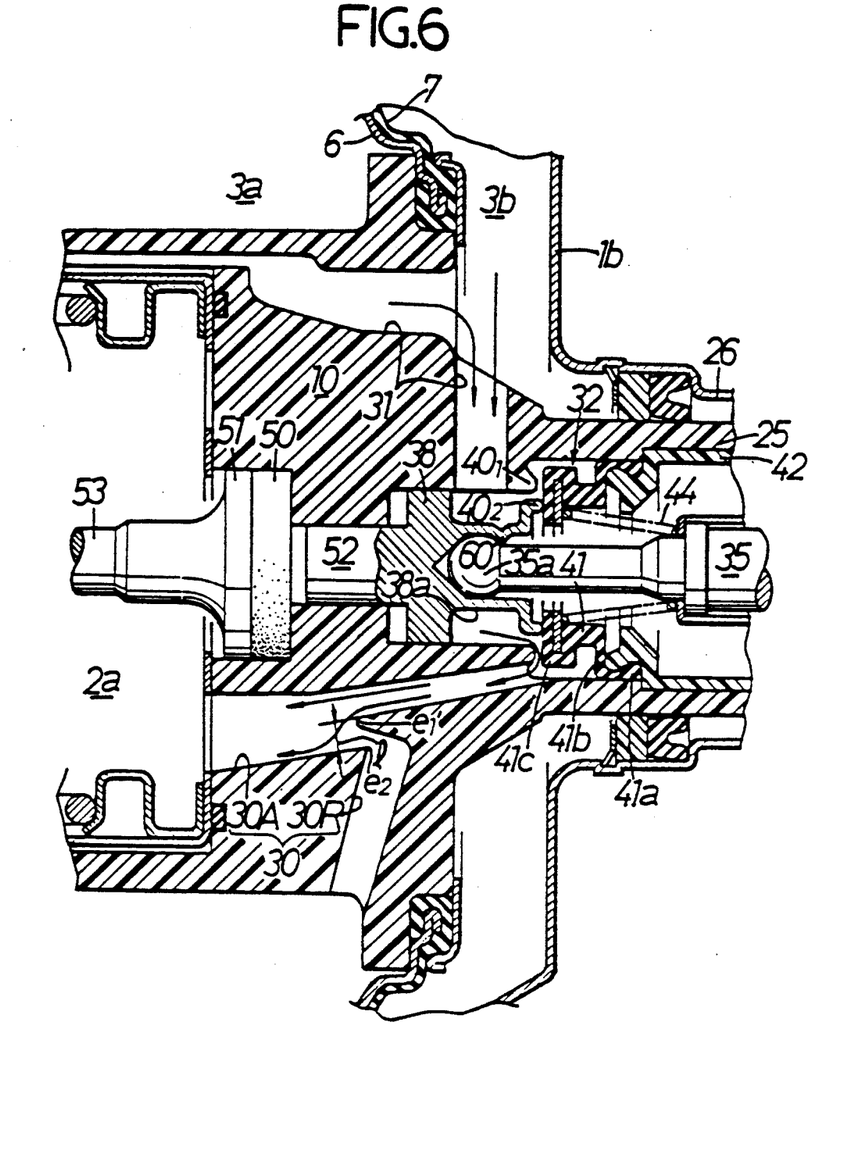
FIG. 6 is a sectional view similar to FIG. 5, showing a second embodiment of the present invention.

FIG. 6 illustrates a second embodiment of the present invention, wherein in addition to the construction of the previous first embodiment, a portion $e_1$, closer to the valve tube 25-side portion, of that opened edge of the radial passage 30R which is closer to the axial passage 30A is protruded in the form of a shelf toward the portion $e_2$ closer to the fore vacuum chamber 2a. With such a construction, it is possible to improve a leaping effect of the air flowing through the axial passage 30A over the radial passage 30R. In FIG. 6, the portions corresponding to those of the previous first embodiment are indicated by the same reference characters.

What is claimed is:

1. A tandem-type vacuum booster comprising a partition plate fixedly mounted in a booster shell for partitioning the interior of said booster shell into a front shell chamber and a rear shell chamber; a front booster piston dividing said front shell chamber into a front-side fore vacuum chamber connected to a vacuum pressure source and a rear-side fore operating chamber; a rear booster piston dividing said rear shell chamber into a front side hind vacuum chamber and a rear-side hind operating chamber, said both booster pistons being interconnected through a piston boss slidably carried on said partition plate and connected to an output rod; a valve tube integrally connected to said piston boss to project from a rear end of said piston boss and slidably supported on a rear wall of said booster shell; a first passage interconnecting an interior of said valve tube with both said vacuum chambers; a second passage interconnecting said interior of said valve tube with both said operating chambers, said first passage including an axial passage interconnecting said fore vacuum chamber and said interior of said valve tube and a radial passage interconnecting said axial passage and said hind vacuum chamber; an input rod movable back and forth within said valve tube; and a control valve connected to said input rod for selectively interconnecting said second passage with said first passage and with an atmosphere source depending upon the backward and forward movements of said input rod, said input rod and said control valve being disposed within said valve tube, said axial passage having a radial inner side wall which extends substantially straightforwardly and a radial outer side wall, a portion of said axial passage, closer to said fore vacuum chamber and between said fore vacuum chamber and said radial passage being larger in diameter than a portion of said axial passage connected to said interior of said valve tube and being offset on the side of said radially outer side wall in a radially outward direction from said axial passage portion connected to the interior of the valve tube to form a step between said axial passage portions.

2. A tandem-type vacuum booster according to claim 1, wherein a portion, closer to said vacuum tube, of said opened end of said radial port which is closer to said axial port is protruded in the form of a shelf toward said portion closer to said fore vacuum chamber.

3. A tandem-type vacuum booster according to claim 1 or 2, wherein said radial port is diverged from the middle of said axial port.

* * * * *